US012472965B2

(12) United States Patent
Yoshikawa et al.

(10) Patent No.: US 12,472,965 B2
(45) Date of Patent: Nov. 18, 2025

(54) VEHICLE CONTROL DEVICE

(71) Applicant: HONDA MOTOR CO., LTD., Tokyo (JP)

(72) Inventors: Fumiaki Yoshikawa, Tokyo (JP); Hisanori Yanagida, Tokyo (JP); Takashi Watanabe, Tokyo (JP); Satoshi Matsushita, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 141 days.

(21) Appl. No.: 18/454,199

(22) Filed: Aug. 23, 2023

(65) Prior Publication Data
US 2024/0067197 A1 Feb. 29, 2024

(30) Foreign Application Priority Data

Aug. 31, 2022 (JP) .................. 2022-138150

(51) Int. Cl.
B60W 50/12 (2012.01)
B60W 50/04 (2006.01)
B60W 50/14 (2020.01)

(52) U.S. Cl.
CPC ........... *B60W 50/12* (2013.01); *B60W 50/04* (2013.01); *B60W 50/14* (2013.01); *B60W 2540/10* (2013.01)

(58) Field of Classification Search
CPC ........ B60R 25/04; B60R 25/24; B60W 10/04; B60W 30/1884; B60W 50/04; B60W 50/12; B60W 50/14; B60W 2040/0143; B60W 2040/146; B60W 2540/10

USPC ............................................. 701/1
See application file for complete search history.

(56) References Cited

U.S. PATENT DOCUMENTS

| 2020/0171943 | A1* | 6/2020 | Otsubo ................ G08G 1/01 |
| 2020/0262446 | A1 | 8/2020 | Mayoshi et al. |
| 2021/0221365 | A1* | 7/2021 | Mase ................ B60W 10/06 |
| 2021/0302977 | A1* | 9/2021 | Saikyo ................ B60W 50/14 |

FOREIGN PATENT DOCUMENTS

| JP | 2020-131862 A | 8/2020 | |
| WO | WO-2020205597 A1 * | 10/2020 | ............. G06N 20/00 |
| WO | WO-2021130859 A1 * | 7/2021 | ............. B60W 10/18 |

* cited by examiner

*Primary Examiner* — Atul Trivedi
(74) *Attorney, Agent, or Firm* — Carter, DeLuca & Farrell LLP

(57) ABSTRACT

A vehicle control device 1 incudes: a detection unit configured to detect an operation onto an accelerator pedal; a driving force limitation unit 21 configured to conduct driving force limitation control of limiting driving force of a vehicle in accordance with the operation onto the accelerator pedal; a limitation setting unit 22 configured to switch between activation and deactivation of the driving force limitation control for every electronic key 5 to be used when driving the vehicle, based on limitation setting information set for every electronic key 5 of the vehicle; and a notification unit 24 configured to give a notification to a driver when an abnormality related to conducting the driving force limitation control is detected, in which the notification unit 24 gives the notification to the driver, when the abnormality is detected, in a case where the driving force limitation control is deactivated.

4 Claims, 4 Drawing Sheets

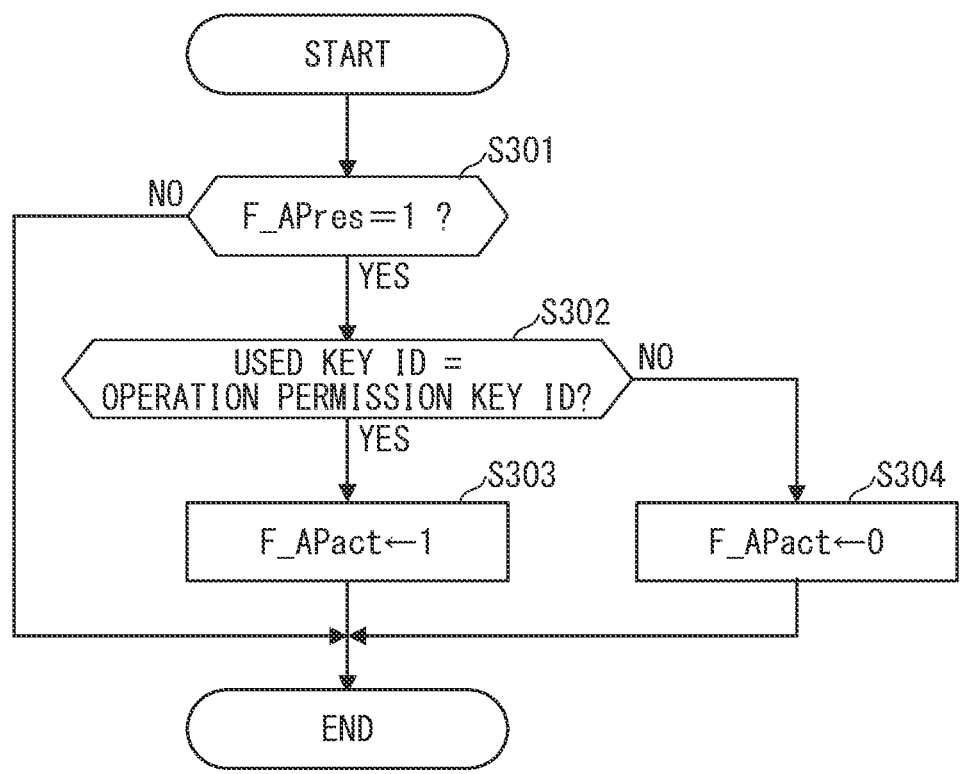

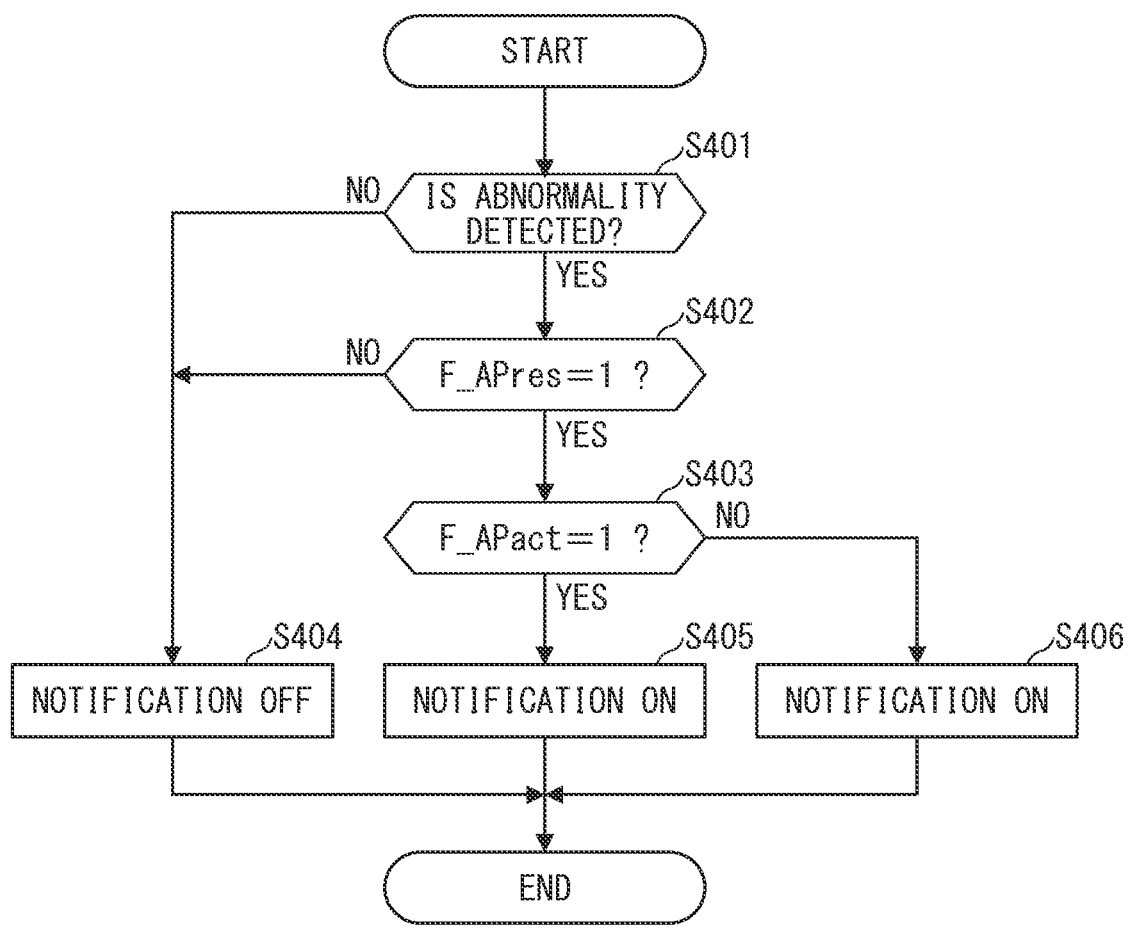

VEHICLE CONTROL DEVICE

BACKGROUND

Technical Field

The present invention relates to a vehicle control device, in a vehicle in which activation and deactivation of control of limiting driving force is switchable under a predetermined condition, the vehicle control device appropriately notifying a driver of an occurrence of a failure related to the above control.

Related Art

In these years, efforts are actively taken to provide access to a sustainable transportation system in consideration of vulnerable people such as elderly people, disabled people, and children among traffic participants. In order to achieve this, focus is given on research and development for further improving safety and convenience of traffic through developments for improvements of behavior stability of vehicles.

As one of the developments for the safety of the vehicles, there is a known technique of controlling braking or driving force of the vehicle in order to avoid sudden acceleration resulting from an erroneous operation or the like of a driver, under a low-speed driving condition such as when starting or stopping the vehicle.

For example, JP 2020-131862 A discloses a vehicle control device that determines whether an erroneous operation state in which there is a high possibility that an erroneous operation of a driver is occurring, conducts limitation control of limiting driving force of a vehicle in a case where the erroneous operation state is determined, and also gives an erroneous operation notification for prompting the driver to eliminate the erroneous operation state. Such a vehicle control device is configured to give an abnormality notification for notifying the driver of an occurrence of an abnormality, in a case where an erroneous operation state is not occurring, when the abnormality that the limitation control cannot be conducted occurs, and to give the erroneous operation notification continuously without giving the abnormality notification, in a case where the erroneous operation state is occurring, when the abnormality occurs. This prevents a decrease in a possibility of making the driver stop the erroneous operation, after the abnormality occurs.

In addition, such a vehicle control device is provided with a switch for switching between permission and prohibition of conducting the above-described limitation control, so that the driver operates this switch and becomes able to select whether to permit or prohibit conducting the limitation control.

CITATION LIST

Patent Literature

Patent Literature 1: JP 2020-131862 A

SUMMARY

In the vehicle control device described in JP 2020-131862 A, in a case where conducting the limitation control is permitted, when an occurrence of the abnormality related to conducting the limitation control, the abnormality notification for notifying the driver of it is described. However, in a case where conducting the limitation control is prohibited, when the abnormality related to conducting the limitation control occurs, whether it should be notified to the driver is not mentioned at all.

Nevertheless, for example, supposing a case of sharing a vehicle with family members, different ways of using are adopted such that in a case where the limitation control is activated for a driver who is an elderly person, whereas the limitation control is deactivated for a driver who is a non-elderly person. While the non-elderly person is driving, when an abnormality such as a failure related to conducting the limitation control occurs, it is desirable to appropriately notify the driver of the abnormality, so that information of a failure state can be shared among the members who shares the vehicle.

The present invention has been made to address such an issue, and has an object to provide a vehicle control device. In a case where control of limiting driving force of a vehicle is deactivated, when an abnormality related to the control of limiting the driving force occurs, the vehicle control device appropriately notifies the driver of the abnormality to enable information sharing among the drivers, and is capable of improving safety of the vehicle. In addition, consequently, the vehicle control device further improves traffic safety, and contributes to advancements in sustainable transportation systems.

In order to achieve this object, a vehicle control device according to a first aspect of the present invention includes: an accelerator pedal operation detection unit (an ECU 2, and an accelerator pedal sensor 41 in an embodiment (hereinafter, the same will apply in the present paragraph)) configured to detect an operation onto an accelerator pedal of a vehicle; a driving force limitation unit 21 configured to conduct driving force limitation control of limiting driving force of the vehicle in accordance with the operation onto the accelerator pedal; a limitation setting unit 22 configured to switch between activation and deactivation of the driving force limitation control for every electronic key 5 to be used when driving the vehicle, based on limitation setting information set for every electronic key 5 of the vehicle; and a notification unit 24 configured to detect an abnormality related to conducting the driving force limitation control of the vehicle, and configured to give a notification to a driver when the abnormality is detected, in which the notification unit 24 gives the notification to the driver, when the abnormality is detected, in a case where the driving force limitation control is deactivated.

According to such a vehicle control device, the driving force limitation control is conducted in accordance with the operation onto the accelerator pedal, and the driving force limitation control is switched between activation and deactivation for every electronic key to be used when driving the vehicle, based on the limitation setting information that has been set for every electronic key of the vehicle. Therefore, for example, in a case where the same vehicle is shared with family members, an elderly driver who feels uneasy about driving is capable of obtaining driving support of the driving force limitation control by using the electronic key that activates the driving force limitation control, and sudden acceleration caused by an erroneous operation onto the accelerator pedal or the like can be prevented, so that the possibility of an accident can be reduced and the safety can be improved. On the other hand, another driver who does not particularly feel uneasy about driving uses the electronic key that deactivates the driving force limitation control, so that the driving force is not unnecessarily limited, and drivability can be improved.

In addition, such a vehicle control device includes a notification unit that gives a notification to the driver of an abnormality, when the abnormality related to conducting the driving force limitation control is detected. When such an abnormality is detected, the notification unit gives the notification to the driver, even in a case where the driving force limitation control is deactivated. Accordingly, even when a failure that is likely to influence conducting the driving force limitation control occurs, while a driver is driving the vehicle with the driving force limitation control deactivated, the notification of a detected failure is given to the driver, so that the driver can immediately know the occurrence of the failure and share it with another driver.

In this manner, according to the vehicle control device in the present invention, in a case where the control of limiting the driving force of the vehicle is deactivated, when the abnormality related to the control of limiting the driving force occurs, it becomes possible to provide the vehicle control device capable of appropriately notifying the driver of the abnormality so that the drivers can share information, and capable of improving safety of the vehicle.

According to a second aspect of the present invention, the vehicle control device described in the first aspect further includes: a storage unit 3 configured to store the limitation setting information of the electronic key 5 that activates the driving force limitation control, in a rewritable manner; and a state determination unit 23 configured to determine that the driving force limitation control is in an available state, in a case where the limitation setting information of the electronic key 5 that activates the driving force limitation control is stored in the storage unit 3, in which the notification unit 24 gives the notification to the driver, when the abnormality is detected, in a case where the driving force limitation control is determined to be in the available state and the driving force limitation control is deactivated.

According to this configuration, the storage unit is capable of storing the limitation setting information of the electronic key that activates the driving force limitation control in a rewritable manner, and the state determination unit determines that the driving force limitation control is in the available state, because the limitation setting information of the electronic key that activates the driving force limitation control is stored. In this manner, in the present configuration, whether the driving force limitation control is in the available state is determined. In a case where the driving force limitation control is determined to be in the available state, the driving force limitation control is switched between activation and deactivation, based on the electronic key to be used when driving the vehicle.

Then, in a case where the driving force limitation control is determined to be in the available state and the driving force limitation control is deactivated, when an abnormality is detected such as a failure that is likely to influence conducting the driving force limitation control, the notification of an occurrence of the abnormality is given to the driver. Therefore, in such a case, the driver is able to immediately know the occurrence of the failure and share it with another driver, so that the safety of the vehicle can be improved.

According to a third aspect of the present invention, in the vehicle control device described in the second aspect, the state determination unit 23 determines that the driving force limitation control is not in the available state, in a case where the limitation setting information of the electronic key 5 that activates the driving force limitation control is not stored in the storage unit 3, and the notification unit 24 does not give the notification to the driver, when the abnormality is detected, in a case where the driving force limitation control is determined not to be in the available state.

According to this configuration, in a case where the limitation setting information of the electronic key that activates the driving force limitation control is not stored in the storage unit and the driving force limitation control is determined not to be in the available state, even though an occurrence of an abnormality is detected such as a failure that is likely to influence conducting the driving force limitation control, no notification is given to the driver. Therefore, no unnecessary notification is given to the driver, and it is possible to prevent the driver from being confused or feeling uneasy.

BRIEF DESCRIPTION OF DRAWINGS

FIG. 3 is a flowchart illustrating control processing of determining whether the driving force limitation control is activated in the vehicle control device according to one embodiment of the present invention; and FIG. 4 is a flowchart illustrating control processing of notifying an abnormality in the vehicle control device according to one embodiment of the present invention.

DETAILED DESCRIPTION

Figure 1:
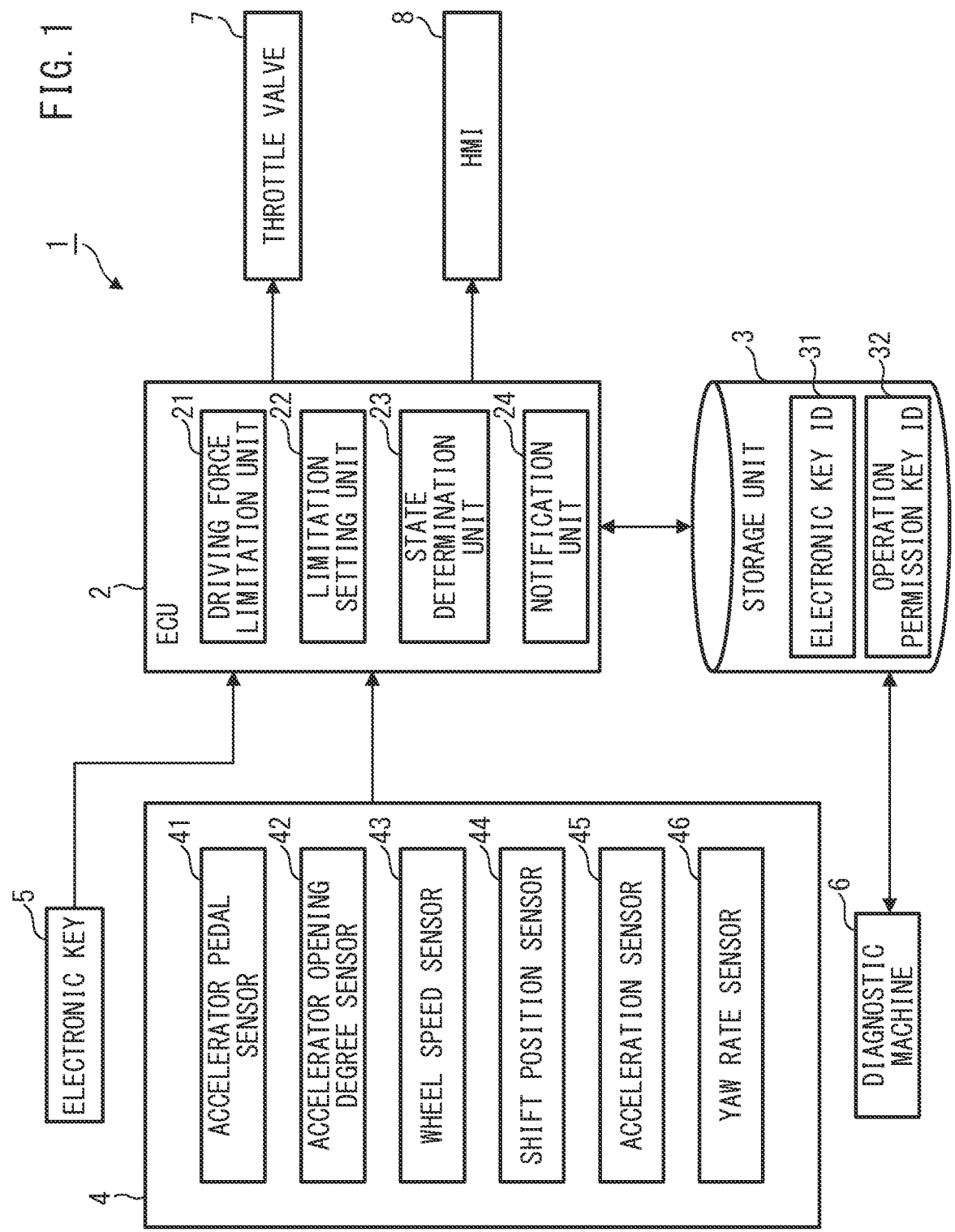
FIG. 1 is a block diagram illustrating a configuration of a vehicle control device according to one embodiment of the present invention.

Hereinafter, preferred embodiments of the present invention will be described in detail with reference to the drawings. FIG. 1 schematically illustrates a configuration of a vehicle control device according to one embodiment of the present invention. The vehicle control device 1 in the present embodiment is mounted on a vehicle such as an automobile, and is configured to start operating along with starting up of an engine (or a motor) of the vehicle, and to be capable of conducting driving force limitation control of limiting driving force in accordance with a traveling state while the vehicle is traveling. In addition, the vehicle control device 1 is configured to be capable of detecting an abnormality such as a failure that is likely to influence conducting the driving force limitation control, when such an abnormality occurs, and notifying the driver of an occurrence of the abnormality under a predetermined condition.

The vehicle control device 1 includes an electronic control unit (ECU) 2, a storage unit 3, and a sensor group 4. The ECU 2 includes a microcomputer including a CPU, a RAM, a ROM, an I/O interface (none of which is illustrated), and the like. The ECU 2 is connected with the sensor group 4, which includes an accelerator pedal sensor 41, an accelerator opening degree sensor 42, a wheel speed sensor 43, a shift position sensor 44, an acceleration sensor 45, a yaw rate sensor 46, and the like, and detection signals of the respective sensors are sequentially input into the ECU 2.

The accelerator pedal sensor 41 is a sensor for detecting an accelerator pedal pressed amount of the driver, an accelerator pedal pressed speed calculated as an increase amount per unit time of the accelerator pedal pressed amount, or the like. A signal related to the pressed amount, the pressed speed, or the like that has been detected by the accelerator pedal sensor 41 is output to the ECU 2.

The accelerator opening degree sensor 42 detects an accelerator opening degree of the vehicle, that is, an opening degree of a throttle valve 7. A signal related to the accelerator opening degree that has been detected by the accelerator opening degree sensor 42 is output to the ECU 2.

The wheel speed sensor 43 is provided on each wheel of the vehicle, and outputs a pulse signal generated in accordance with the rotation of each wheel to the ECU 2. The ECU 2 acquires the wheel speed of every wheel, based on a detection signal from each wheel, and averages the wheel speeds to acquire the vehicle speed.

The shift position sensor 44 is a sensor for detecting an operation position of a shift switch or a shift lever (neither of which is illustrated) provided in the vicinity of a driver's seat in the interior of the vehicle. The shift switch/lever is for selecting each of shift positions, for example, the D range for forward traveling, the R range for backward traveling, the P range for parking, and the like in accordance with its operation position. Information of the shift position that has been detected by the shift position sensor 44 is output to the ECU 2.

The acceleration sensor 45 is, for example, a sensor for respectively detecting acceleration in front-rear direction, in left-right direction, and in up-down direction of the vehicle. A signal related to the acceleration that has been detected by the acceleration sensor 45 is output to the ECU 2.

The yaw rate sensor 46 outputs, to the ECU 2, a signal corresponding to a yaw rate that is an angular velocity around the center of gravity of the vehicle, when viewed from above. The ECU 2 acquires the yaw rate based on the signal from the yaw rate sensor 46.

The ECU 2 reads and executes a program stored in the ROM or the RAM, and implements functions of the respective units, such as a driving force limitation unit 21, a limitation setting unit 22, a state determination unit 23, and a notification unit 24.

The driving force limitation unit 21 conducts driving force limitation control of limiting the driving force of the vehicle, by limiting an upper limit value or the like of the opening degree of the throttle valve 7, in a case where it is determined that the driver has performed a sudden accelerator operation under a predetermined condition. Note that in a case of an electric vehicle or a hybrid vehicle using a motor as a power source, it can be configured such that the driving force of the vehicle is limited by, for example, limiting an output of the motor, instead of limiting the opening degree of the throttle valve.

The predetermined condition for conducting such driving force limitation control can be appropriately changed depending on the design. For example, the vehicle speed that serves as a condition may be made different between a case where the shift position is in the D range and a case where the shift position is in the R range. In addition, in consideration of various conditions such as a pressed state onto a brake pedal, a lighting state of a blinker, and a gradient of a traveling road surface, it can be set such that the driving force limitation control is conducted only under a traveling condition that a sudden accelerator operation has a higher possibility of being caused by an erroneous operation.

Further, it can be set such that a determination that the driver has performed the sudden accelerator operation is made under a condition that an accelerator pedal operation amount, such as the pressed amount, the pressed speed, or the number of pressed times of the accelerator pedal, exceeds a predetermined threshold.

In addition, the way of applying the limitation in the case of limiting the driving force of the vehicle is set to be capable of suppressing sudden start of the vehicle to avoid a risk of a traffic accident or the like, when a sudden accelerator operation caused by an erroneous operation occurs. For example, the upper limit value of the opening degree of the throttle valve 7 may be set to substantially 0, so that only the driving force corresponding to the creep phenomenon works on the vehicle. Further, after the upper limit value of the opening degree of the throttle valve 7 is set to substantially 0, it can also be set to gradually reduce the limitation within a range that does not exceed a predetermined vehicle speed. When pressing onto the accelerator pedal is canceled while the driving force limitation is being conducted, it is determined that the sudden accelerator operation has ended, and the limitation of the driving force is canceled.

The limitation setting unit 22 switches between activation and deactivation of the driving force limitation control described above. This switching between activation and deactivation is performed, based on limitation setting information that has been set for every electronic key 5 to be used for driving the vehicle. Details will be described below.

The electronic key 5 holds ID information (hereinafter, referred to as an electronic key ID 31) that is set for every electronic key 5 in a storage unit (not illustrated) inside the electronic key 5, and is configured such that by operating, for example, a switch (not illustrated) provided on the electronic key 5, it becomes possible to transmit the electronic key ID 31 to an authentication device (not illustrated) of a vehicle in the vicinity.

A plurality of electronic keys 5 can be created for one vehicle, and the electronic key ID 31 of each electronic key 5 is registered in the authentication device beforehand to be associated with the authentication device. When starting to drive the vehicle, authentication is performed by collating whether the electronic key ID 31 of the electronic key 5 possessed by the driver matches the registered one in the authentication device. When this authentication is successful, it is configured to be able to unlock or lock the door lock of the vehicle, and to start up the engine or the motor.

In the present embodiment, the electronic key ID 31 is used as the limitation setting information for switching between activation and deactivation of the driving force limitation control. The storage unit 3 in the vehicle control device 1 is configured to be capable of storing the electronic key ID 31 registered in the authentication device of the vehicle, and in addition, capable of registering a given one of them as an electronic key ID (hereinafter, referred to as an operation permission key ID 32) that activates the driving force limitation control. Note that usually, registration work of the electronic key ID 31 and the operation permission key ID 32 in the storage unit 3 is performed by, for example, a staff member of a dealer shop or the like via a diagnostic machine 6 that is a dedicated terminal, in the delivery time of a purchased vehicle.

When the vehicle control device 1 starts operating, the limitation setting unit 22 identifies the electronic key ID 31 of the electronic key 5 possessed by the driver, and determines whether it is a registered one as the operation permission key ID 32. In a case where the electronic key 5 possessed by the driver is a registered one as the operation permission key ID 32, the driving force limitation control is activated, and in a case where the electronic key 5 is not a registered one as the operation permission key ID 32, the driving force limitation control is deactivated.

In this manner, it is possible to set a plurality of electronic keys 5 individually for activating or deactivating the driving force limitation control. Therefore, for example, in a case where the same vehicle is shared with family members, the electronic key 5 for activating the driving force limitation control and the electronic key 5 for deactivating the driving force limitation control are both possessed, and the electronic keys 5 to be used when driving the vehicle are selectively used, so that it becomes possible to easily switch between activation and deactivation of the driving force limitation control for every driver. Accordingly, for example, it becomes possible to selectively use the electronic keys such that an elderly driver who feels uneasy about driving uses the electronic key that activates the driving force limitation control to obtain driving support of the driving force limitation control, whereas another driver who does not particularly feel uneasy about driving uses the electronic key that deactivates the driving force limitation control to avoid unnecessary limitation of the driving force.

In the vehicle on which the vehicle control device 1 is mounted, the state determination unit 23 determines whether the above-described driving force limitation control that is switchable between activation and deactivation is set to an available state. The above determination is made, based on whether the operation permission key ID 32 is registered in the storage unit 3. That is, in a case where one or more operation permission key IDs 32 are registered in the storage unit 3, it is determined that the driving force limitation control is set to the available state, and in a case where no operation permission key ID 32 is registered, it is determined that the driving force limitation control is not set to the available state.

As described above, the registration of the operation permission key ID 32 is usually performed by a staff member of the dealer shop or the like via the diagnostic machine 6 that is a dedicated terminal, in the delivery time of a purchased vehicle. When purchasing the vehicle or the like, the driver is able to select whether to set the driving force limitation control to the available state, as an optional function of the vehicle to be optionally selectable.

In this manner, in the present embodiment, for example, when purchasing the vehicle or the like, it is possible to select whether to set the driving force limitation control to the available state. Additionally, in the case of setting to the available state, by respectively setting the electronic key 5 for activating the driving force limitation control and the electronic key 5 for deactivating the driving force limitation control, it becomes possible to select whether to activate or deactivate the driving force limitation control, for example, for every driver, whenever driving the vehicle.

In a case where the driving force limitation unit 21 determines that the driver has performed a sudden accelerator operation, the notification unit 24 gives a notification to the driver that the sudden accelerator operation has been detected, that a function of suppressing the driving force is being activated, and the like, via various types of a human machine interface (HMI) 8. Examples of the notification via such an HMI include displaying a warning with characters on a display provided on a dashboard, a control panel, or the like, issuing an attention or a warning sound by audios from an in-vehicle speaker, and the like. However, without being limited to them, any kind of notification may be used, as long as it is possible to give a warning to the driver appropriately.

In addition, the notification unit 24 is configured to be capable of monitoring the operations of the respective sensors 41 to 46 of the sensor group 4 in a known method, and to detect an abnormality, when such an abnormality that is likely to influence conducting the driving force limitation control occurs, such as a failure of each sensor or a failure of a communication system between each sensor and the ECU 2. In a case where the abnormality is detected, a notification is given to the driver that the abnormality has been detected, the function of suppressing the driving force is not normally operated, or the like, via the HMI 8 under a predetermined condition to be described later.

Figure 2:
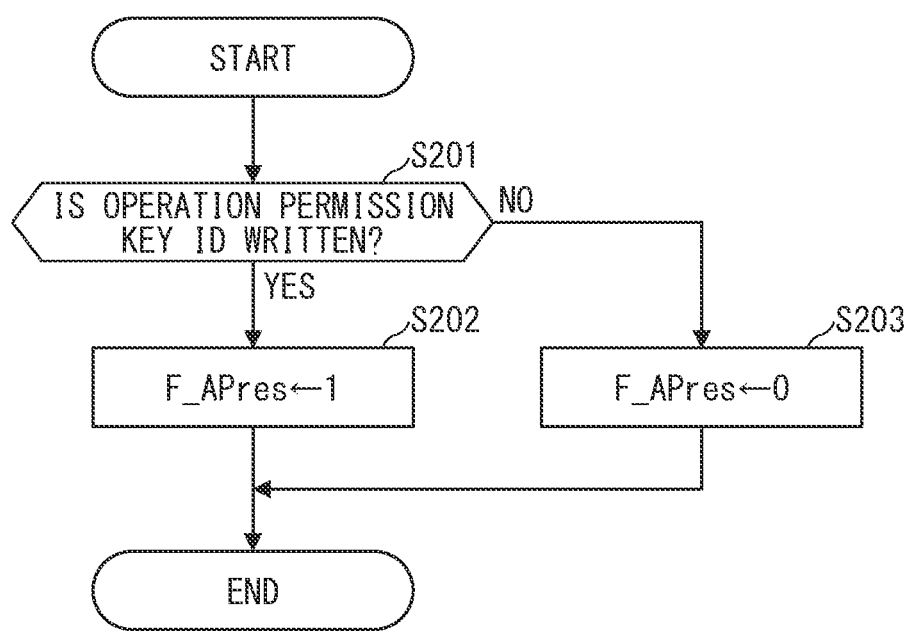
FIG. 2 is a flowchart illustrating control processing of determining an available state of driving force limitation control in the vehicle control device according to one embodiment of the present invention.

FIG. 2 illustrates control processing of determining an available state of the driving force limitation control in the vehicle control device 1 in the present embodiment. The present processing is usually performed, when the vehicle control device 1 is connected to the diagnostic machine 6, in the delivery time of the vehicle or in changing the setting in a dealer shop.

In the present processing, first, step 201 (indicated as "S201" in the drawing. Hereinafter, the same will apply), it is determined whether the electronic key ID 31 of the electronic key 5, to be registered as the electronic key 5 that activates the driving force limitation control, is written by a staff member of the dealer shop or the like in the storage unit 3, as the operation permission key ID 32.

In a case where a determination result is YES and the operation permission key ID 32 is written in the storage unit 3, the processing proceeds to step 202, a value of a flag F_APres is set to "1", and the present processing ends. On the other hand, in a case where the determination result in step 201 is NO and the operation permission key ID 32 is not written in the storage unit 3, the processing proceeds to step 203, the value of the flag F_APres is set to "0", and the present processing ends.

Note that the flag F_APres indicates whether the operation permission key ID 32 is written in the storage unit 3, is set to "1" in a case where the operation permission key ID 32 is written, and is set to "0" in a case where the operation permission key ID 32 is not written. In a case where the value of the flag F_APres is "1", which means that the driving force limitation control is set to the available state, and in a case where the value is "0", which means that the driving force limitation control is not set to the available state.

Next, FIG. 3 illustrates control processing of determining whether the driving force limitation control is activated in the vehicle control device 1 in the present embodiment. The present processing is performed, when the vehicle control device 1 starts operating (that is, when the engine (motor) of the vehicle is started up).

In the present processing, first, in step 301, it is determined whether the value of the flag F_APres is set to "1". In a case where a determination result is NO, that is, in a case where the value of the flag F_APres is "0", the driving force limitation control is not set to the available state. Thus, the processing does not proceed to the next step, and the present processing ends.

On the other hand, in a case where the determination result of step 301 is YES, that is, in a case where the value of the flag F_APres is "1", the driving force limitation control is set to the available state. Thus, the processing proceeds to the next step 302. In step 302, it is determined whether the electronic key ID 31 of the electronic key 5 possessed by the driver (that is, the electronic key 5 to be used when the vehicle is driven) is registered in the storage unit 3, as the operation permission key ID 32.

In a case where a determination result in step 302 is YES and the electronic key ID 31 of the electronic key 5 possessed by the driver is registered as the operation permission key ID 32, the processing proceeds to step 303, a value of a flag F_APact is set to "1", and the present processing ends. On the other hand, in a case where the determination result in step 302 is NO and the electronic key ID 31 of the electronic key 5 possessed by the driver is not registered as the operation permission key ID 32, the processing proceeds to step 304, the value of the flag F_APact is set to "0", and the present processing ends.

Note that the flag F_APact indicates whether the electronic key ID 31 of the electronic key 5 possessed by the driver is registered as the operation permission key ID 32, is set to "1" in a case where it is registered as the operation permission key ID 32, and is set to "0" in a case where it is not registered as the operation permission key ID 32. In a case where the value of the flag F_APact is "1", which means that the driving force limitation control is activated, and in a case where the value is "0", which means that the driving force limitation control is deactivated.

Next, FIG. 4 illustrates control processing of an abnormality notification in the vehicle control device 1 in the present embodiment. The present processing is repeatedly performed at a predetermined time interval in a normal driving state of the vehicle. In the present processing, first, in step 401, it is determined whether an abnormality has been detected, such as a failure of the sensor group or a communication system that is likely to influence conducting the driving force limitation control.

In a case where a determination result is NO and no abnormality such as a failure is detected, there is nothing in particular that should be notified to the driver. Therefore, the processing proceeds to step 404, and no notification is given to the driver, and the present processing ends. On the other hand, in a case where the determination result in step 401 is YES and an abnormality such as a failure is detected, it is determined in the next step 402 whether the value of the flag F_APres is set to "1".

In a case where the determination result is NO and the value of the flag F_APres is "0", it is determined that the driving force limitation control is not set to the available state, and the notification of the abnormality is not given to the driver. Therefore, also in this case, the processing proceeds to step 404, no notification is given to the driver, and the present processing ends. By controlling in this manner, it is possible to avoid giving the notification of the abnormality related to the driving force limitation control to the driver of the vehicle for which the driving force limitation control is not set to the available state, and to avoid confusing the driver.

On the other hand, in a case where the determination result in step 402 is YES and the value of the flag F_APres is "1", it is determined that the driving force limitation control is set to the available state, and in next step 403, it is determined whether the value of the flag F_APact is set to "1".

In a case where a determination result is YES and the value of the flag F_APact is "1", it is determined that the driving force limitation control is activated. In next step 405, a notification is given to the driver that an abnormality related to conducting the driving force limitation control has been detected, the driving force limitation control is not being conducted normally, or the like via various HMIs provided in the vehicle, and the present processing ends. In the present embodiment, for example, a message such as "Abnormality of sudden accelerator suppression function" or "System does not operate" is displayed on a display provided in a control panel, and a warning sound is also emitted from an in-vehicle speaker to give the notification to the driver. Note that the warning sound can be configured to be sounded for a predetermined period of time, and then to stop it. On the other hand, it can be configured such that the message on the display is continuously displayed, until a predetermined operation for deleting the message is performed. Accordingly, it becomes possible to prevent the driver from forgetting that the abnormality has occurred.

On the other hand, in a case where the determination result in step 403 is NO and the value of the flag F_APact is "0", it is determined that the driving force limitation control is deactivated. Also in this case, in subsequent step 406, a notification is given to the driver that the abnormality has been detected, the driving force limitation control is not normally conducted, or the like via the HMI, and the present processing ends. Contents and a method for the notification may be similar to those in step 405. By conducting the control in this manner, it becomes possible for the driver to immediately understand and recognize an occurrence of an abnormality, such as a failure that is likely to influence the driving force limitation control. Therefore, it is possible to take measures such as information sharing of the abnormality with another driver who shares the vehicle, or arranging repair of the failure.

As described heretofore, according to the vehicle control device 1 in the present embodiment, in a case where an abnormality such as a failure that is likely to influence conducting the driving force limitation control, is detected, an occurrence of such an abnormality or the like is notified to the driver, even when the driving force limitation control is deactivated. Therefore, with the vehicle control device 1 in the present embodiment, even when a failure or the like occurs, while a driver is driving the vehicle with the driving force limitation control deactivated, the driver is able to immediately know the occurrence of the failure or the like, share information, and handle the failure. Therefore, the safety of the vehicle can be improved.

Note that the present invention is not limited to the embodiments that have been described, and can be implemented in various aspects. For example, in the above-described embodiments, the respective sensors 41 to 46 have been described as the sensor group 4. However, these sensors are merely examples, and the sensor group 4 may include any other sensor related to conducting the driving force limitation control. For example, the sensor group 4 can include a brake pedal sensor, a blinker sensor, a gradient sensor, or the like.

In addition, in an embodiment, the storage unit 3 is provided outside the ECU 2. However, a ROM or a RAM inside the ECU may be configured to function as the storage unit 3. Additionally, the detailed configuration can be changed as appropriate within the scope of the gist of the present invention.

What is claimed is:

1. A vehicle control device comprising:
an accelerator pedal operation detection unit configured to detect an operation onto an accelerator pedal of a vehicle;
a driving force limitation unit configured to conduct driving force limitation control of limiting driving force of the vehicle in accordance with the operation onto the accelerator pedal;
a limitation setting unit configured to switch between activation and deactivation of the driving force limitation control for every electronic key to be used when driving the vehicle, based on limitation setting information set for every electronic key of the vehicle; and
a notification unit configured to detect an abnormality related to conducting the driving force limitation control of the vehicle, and configured to give a notification to a driver when the abnormality is detected, wherein the notification unit gives the notification to the driver, when the abnormality is detected, in a case where the driving force limitation control is deactivated.

2. The vehicle control device according to claim 1, further comprising:
a storage unit configured to store the limitation setting information of the electronic key that activates the driving force limitation control, in a rewritable manner; and
a state determination unit configured to determine that the driving force limitation control is in an available state, in a case where the limitation setting information of the electronic key that activates the driving force limitation control is stored in the storage unit, wherein
the notification unit gives the notification to the driver, when the abnormality is detected, in a case where the driving force limitation control is determined to be in the available state and the driving force limitation control is deactivated.

3. The vehicle control device according to claim 2, wherein
the state determination unit determines that the driving force limitation control is not in the available state, in a case where the limitation setting information of the electronic key that activates the driving force limitation control is not stored in the storage unit, and
the notification unit does not give the notification to the driver, when the abnormality is detected, in a case where the driving force limitation control is determined not to be in the available state.

4. The vehicle control device according to claim 2, wherein
the limitation setting unit switches between activation and deactivation of the driving force limitation control based on the limitation setting information of the electronic key held by the driver of the vehicle when the vehicle control device is started.

* * * * *